Nov. 13, 1951   J. S. THOMPSON ET AL   2,574,801
POWER LINE SERVICE RESTORER
Filed July 29, 1947   3 Sheets-Sheet 3
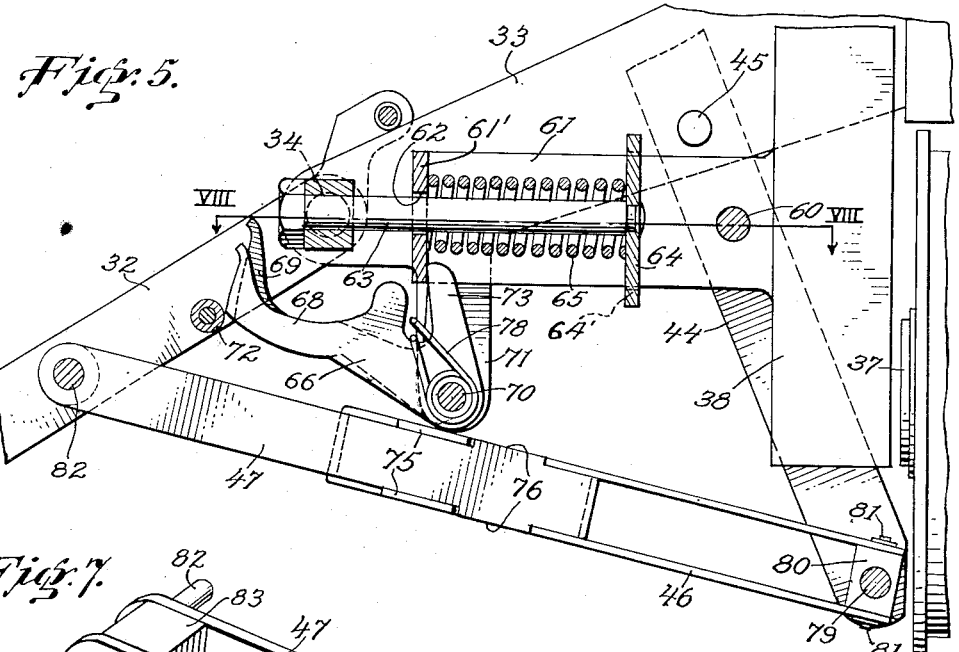
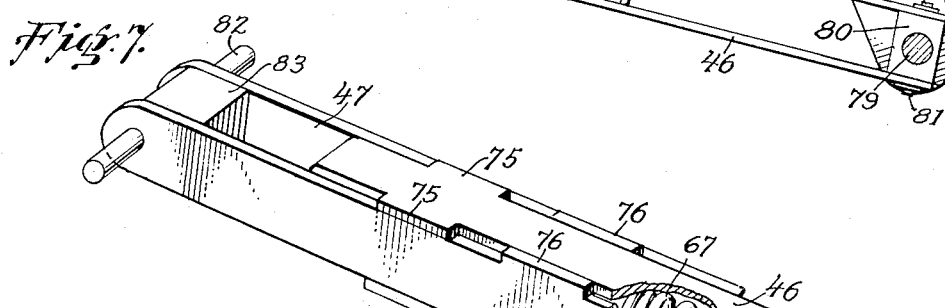
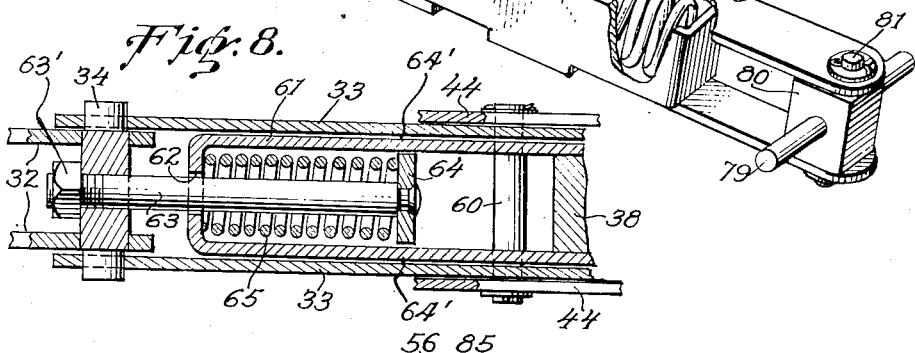
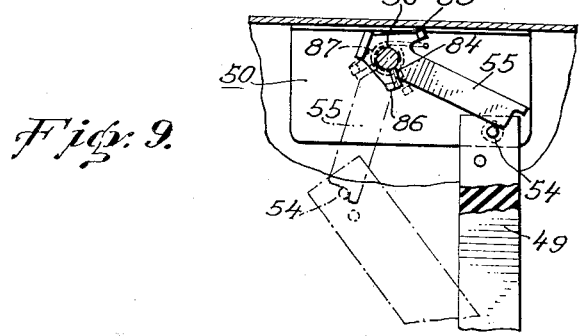
INVENTOR.
JOSEPH S. THOMPSON
BY   & CHARLES R. RAY.
ATTORNEY Patented Nov. 13, 1951

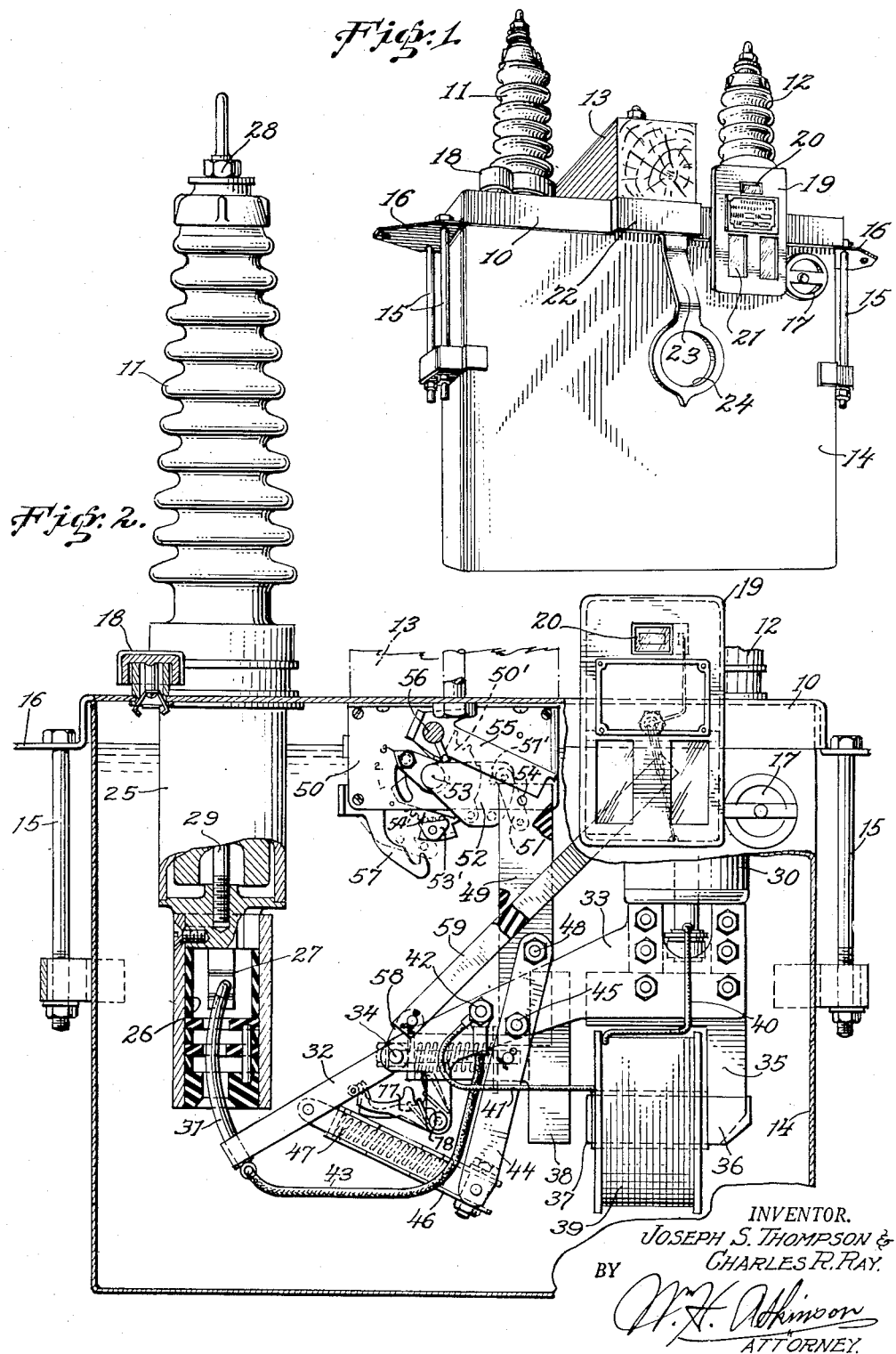

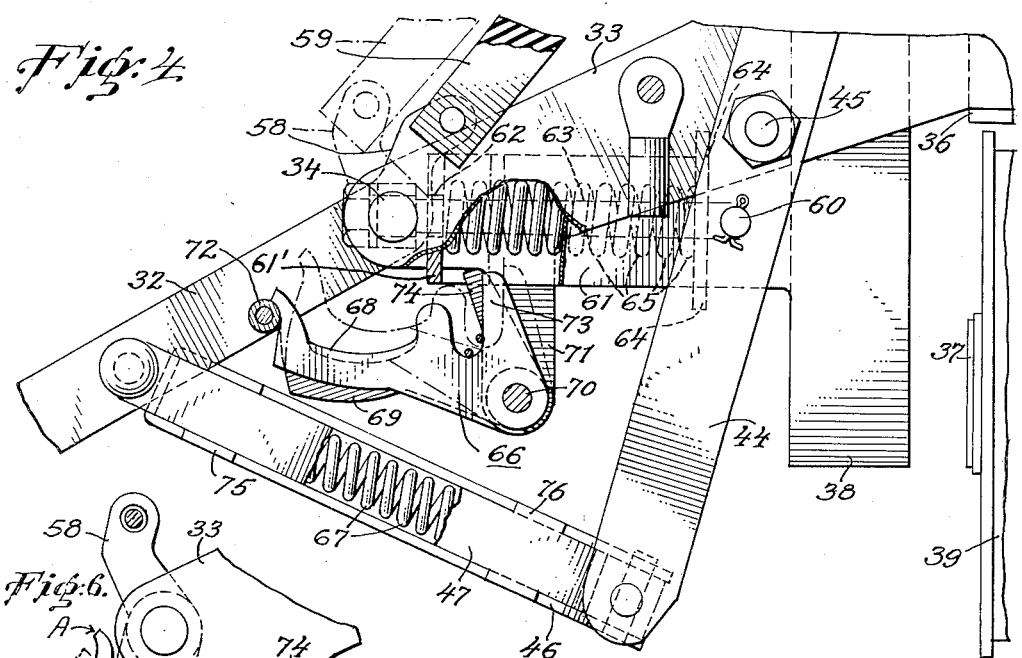
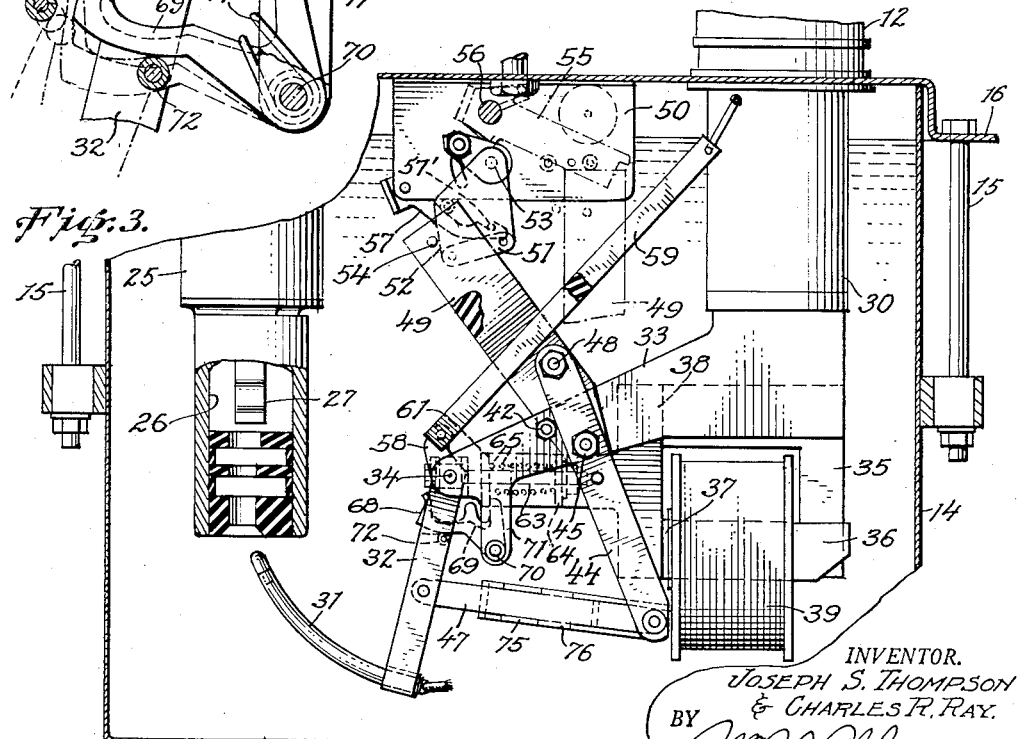

2,574,801

UNITED STATES PATENT OFFICE 2,574,801

POWER LINE SERVICE RESTORER

Joseph S. Thompson, San Francisco, and Charles R. Ray, Sausalito, Calif., assignors to Pacific Electric Manufacturing Corporation, San Francisco, Calif., a corporation of California Application July 29, 1947, Serial No. 764,522

7 Claims. (Cl. 200—89)

Our present invention relates to a new and improved electric power line protecting device and has for its object the provision of an automatically operating circuit breaker which, in the event of a continuing fault, is adapted to disconnect the overloaded or faulted section of a system and reclose to restore service on the faulted or overloaded portion of the system in the event that the overload or fault is of a transient nature.

Another object of our invention is to provide a novel spring operated mechanism for an automatic reclosing circuit breaker in which a series coil operates in response to an overload condition to store up operating energy in a spring arrangement that will provide a substantially instantaneous opening and reclosing of the circuit through the circuit breaker upon a single tripping thereof.

Another object of the invention is to provide a novel latching and tripping mechanism for an automatic reclosing circuit breaker in which the operation of a reclosing spring is supplanted by an additional spring means that becomes operative at or near the end of the closing stroke of the reclosing mechanism to insure a positive engagement between the circuit controlling contacts.

Another object of the invention is to provide a spring operated mechanism for a reclosing circuit breaker in which a series coil operates, to simultaneously store energy in an opening spring and a reclosing spring means and also directly applies a positive force to the operating mechanism independently of the spring mechanism during circuit opening operation of the circuit breaker.

Another object of the invention is to provide a practical and inexpensive reclosing circuit breaker for use upon single phase power circuits by which a cycle of instantaneous openings and reclosings and delayed openings and reclosings may be provided for in the event of a fault or overload upon the circuit which persists through said cycle.

With the increasing use of electrical energy for domestic and industrial purposes in rural districts, it has become more and more important that protective means be provided for these transmission lines that will protect the power circuit against overloads and other abnormal conditions and, at the same time, provide, as nearly as possible, an uninterrupted service for these customers. It is therefore a further object of our invention to provide an arrangement by which the service restorer operation under prescribed conditions may be rendered inoperative after a predetermined number of circuit restoring operations in the event that the fault or overload persists upon the circuit controlled thereby.

Other objects and advantages of our invention will be in part evident to those skilled in the art and in part pointed out hereinafter in connection with the accompanying drawings, wherein there is shown by way of illustration and not of limitation a preferred embodiment of the invention.

In the drawing:

Figure 1 is a prespective view showing the exterior of a service restorer constructed in accordance with the invention, Figure 2 is a fragmentary sectionalized view with parts broken away and showing the circuit controlling contacts of the service restorer in their closed circuit position, Figure 3 is a view similar to Figure 2 showing the circuit controlling contacts of the service restorer in their open circuit position, Figure 4 is an enlarged fragmentary view of the contact operating mechanism of the service restorer, Figure 5 is a view similar to Figure 4 showing the parts in different positions, Figure 6 is a fragmentary view showing further details of the construction, Figure 7 is a perspective view showing another part of the invention, Figure 8 is a fragmentary sectional view taken along line VIII—VIII of Figure 5, and Figure 9 is a fragmentary view showing a further feature of the invention.

While the principles of operation and the elements employed in the construction of our improved service restorer may find application in service restorers and automatic reclosing circuit breakers of other types and capacities, we are in this disclosure describing our invention as embodied in a single pole service restorer for a high potential circuit and having an interrupting capacity of from 10 to 25 kilowatts.

As is illustrated in Figure 1 of the drawings our improved service restorer has a main supporting frame or cover portion 10 upon which suitable bushings 11 and 12 are mounted in spaced relation and through which the conductors of the circuit to be controlled are extended. In this particular instance the cover or frame portion 10 is shown as adapted to be secured to the underside of a cross arm 13 such as is carried by a pole or other elevated structure. The cover or frame portion 10 serves as a support for a tank 14 which contains a suitable insulated and arc extinguishing oil or other fluid into which the circuit controlling contacts and the operating mechanism of our service restorer are submerged. The tank 14 is suspended from the cover or frame portion 10 by means of tie bolts 15 which extend downwardly from flanges 16 at the ends of the cover portion 10. In certain instances these flanges 16 may also be employed as a means for securing our service restorer between two spaced cross-arms or other supporting members where a single cross arm 13 cannot be conveniently employed. At one side and near its top the tank 14 is shown as having a sight opening 17 through which the level of the arc extinguishing fluid or oil contained therein may be observed and at its other end there is a breather cap 18. Mounted upon one side of the cover 10 there is also an indicating device 19 which has a sight opening 20 near its top through which a conventional operations counter may be viewed and at its lower end the indicating device 19 has two spaced apertures 21 through which a movable semaphore is viewable as an indication of the condition of the circuit controlling contacts at any particular time. For example, when the service restorer is operating and its circuit controlling contacts are closed the semaphore will provide for a red indication in both of the apertures 21, whereas on the contrary when the service restorer contacts are open the semaphore will provide for a green indication in each of the apertures 21. The other details and advantages of this indicating device 19 is to form the subject matter of a co-pending application entitled, Condition Indicating Device, Serial No. 770,478; filed August 25, 1947, by the applicants hereof, now abandoned. As is also illustrated in this figure of the drawings the cover or supporting frame 10 is extended outwardly at one of its sides as at 22 to form a cape-like covering for the upper end of a lever 23 by which our service restorer may be manually operated from a point externally of the tank 14. In this instance the lever 23 has a ring-like end 24 for the accommodation of a lineman's operating stick.

As it will be seen by reference to Figures 2 and 3 of the drawings the insulating bushings 11 and 12 are extended downwardly through the cover or frame portion 10 where they form a support for the operating mechanism of our service restorer and also the stationary and movable contacts associated therewith. In this particular embodiment the insulating bushing 11 has a cylindrical extension 25 upon the lower end of which there is mounted an arc expulsion chamber 26 within which a stationary contact 27 is disposed. The contact 27 is here shown as connected to a terminal 28 at the upper end of the insulating bushing 11 by means of a conductor 29. In a like manner the insulating bushing 12 is provided with a cylindrical extension 30 upon which the movable circuit controlling contact of our service restorer is mounted. This movable contact, here designated by the numeral 31, is carried by an arm 32 that is pivotally secured between two similar and spaced supporting brackets 33 by a transversely extending pin 34. The spaced supporting brackets 33 are bolted to the sides of a projection upon the cylindrical extension 30 of the insulating bushing 12 and serve to clamp a laminated U-shaped magnetic frame 35 in a fixed position. This magnetic frame 35 has two horizontally projecting poles 36 and 37 with which a horizontally movable armature 38 is adapted to cooperate. As a means for exciting the magnetic field 35 there is a series coil 39 which is connected at one end to a terminal at the upper end of the insulating bushing 12 by means of a conductor 40 and the other end of the coil 39 is connected through a conductor 41 to a terminal 42 from which a flexible cable 43 extends to the movable contact 31. In this way when the movable contact 31 is in engagement with the stationary contact 27 a circuit will be completed through the magnetic field energizing coil 39 and between the line terminals at the upper ends of the insulating bushings 11 and 12. This provides a conducting path through which the current passing through the circuit restorer may pass without traversing any of the pivotal or less conducting parts of the operating mechanism. Secured along the outer surface of each of the spaced supporting brackets 33 there are two similar levers 44 that are pivotally mounted intermediate their ends upon a transversely extending stud 45. The lower ends of these spaced levers 44 are here shown as hingedly connected to a clevis-like member 46 which in cooperation with a similar clevis-like member 47 forms, as will hereinafter appear, an extendable or elastic energy storing connection with the movable contact supporting arm 32. The upper ends of these levers 44 are tied together in spaced relation by a stud and bushing arrangement 48 and rigidly secured at the upper end of the far one of said levers 44 there is an upwardly extending member 49 of insulating material which serves as an operating connection with a timing mechanism 50. At this point it would seem sufficient to merely state that the upwardly extending member 49 of insulating material is connected through a floating link 51 to a spring biased sector 52 which when turned clockwise about an axis 53 will set the timing mechanism 50 in operation and thus provide the particular timing in the operations of the movable contact 31 as desired. It will be also here noted that the upwardly extending member 49 is provided with an outwardly projecting pin 54 with which a lever arm 55 is adapted to engage when the latter arm is swung in a clockwise direction by a turning of a shaft 56 which can now be described as controlled by the externally disposed lever 23, previously referred to as a manual operations controlling means. At this point it should also be noted that the timing mechanism 50 also carries a latching hook 57 that is adapted to engage with an inwardly extending pin 57' carried by the sector 52 and lock the operating mechanism in an open circuit condition after a predetermined number of opening and reclosing operations or in other words after a complete operating cycle thereof occurs within a predetermined period of lapsed time. The timing mechanism 50 is constructed along conventional lines in that it has, as shown in Figures 2 and 3 of the drawings, a notched sector 50' that is adapted to be engaged by a driving pawl (not shown) but which is connected to and operated by the sector 52. The notched sector 50' is biased into the position shown in dotted lies in Figure 2 by means of a torsion spring that is fixed at its outer end to the housing of the timing mechanism. Associated with this notched sector 50' there is also a second pawl 53' that engages with a gear 54' which is retarded in its rotation by an inertia type escapement similar in its operating characteristics to that shown in United States patent to Watkins and Atkinson, No. 2,387,373, assigned to the assignee hereof. When in operation this escapement slows down the return movements of the notched sector 50' under the influence of its biasing spring and thus when any successive operation of the circuit breaker occurs within a predetermined time the notched sector 50' will be advanced one notch at a time until the circuit breaker is locked in its circuit open position by means of the latching hook 57, as indicated above. It should be here pointed out that the latching hook 57 is normally held in an inactive position by a cam means that is connected to and moves in unison with the notched sector 50' of the timing device 50 which, as indicated above, is moved in a step-by-step manner throughout its full cycle of movement only when a series of successive circuit opening and reclosing operations of the circuit breaker are completed within a predetermined time interval. Therefore, the circuit breaker contacts cannot be locked out by the latching hook 57 until the circuit breaker has successively opened and reclosed a predetermined number of times in rapid succession. In the arrangement here shown the timing mechanism is adapted and arranged to render the latching hook 57 operative immediately following the fourth circuit opening operation of the circuit breaker. This will provide for three complete reclosing operations, after which the circuit breaker will be locked out and then a manual reset will be necessary. Before continuing with reference to the remaining figures of the drawings it should also be noted that the movable contact carrying arm 32 has an upwardly disposed extension 58 to which a link 59 of insulating material is attached. This link 59 serves to connect the movable contact carrying arm 32 with the indicating device 19 and in this way the number of operations of the movable contact 31 will be registered by a counter visible through the aperture 20 of the indicating device 19 while the position of the movable contact 31 at any particular time will be indicated by the color presentation in the apertures 21 thereof.

Upon now referring to Figures 4 and 5 of the drawings it will be seen that the armature 38 is suspended between the spaced supporting brackets 33 and secured by a transversely extending pin 60 to the spaced levers 44 below the transversely extending stud 45 upon which the spaced levers 44 are pivotally mounted. Extending rearwardly of the armature 38 there is a yoke-like member 61 having an opening 62 at its outer end through which a stud 63 is extended from a spacing block at the outer end of the spaced supporting brackets 33. This stud 63 extends into the space between the sides of the yoke-like member 61 where at its end it has a transversely extending head 64 that serves to retain a compression or reclosing spring 65 which acting against the outer end 61' of the yoke-like member 61 will serve to move and hold the operating levers 44 in a circuit closed position, as shown in Figure 4. In this particular figure of the drawings the movable contact supporting arm 32 is shown as in its circuit closed position where it is adapted to be held by a latching means 66 which will be described in greater detail hereinafter. When the movable contact supporting arm 32 and the operating levers 44 are in the positions here shown it will also be noted that the clevis-like members 46 and 47 will be in full telescoping relation with each other so that they will operate to provide a rigid strut through which an operating force may be transmitted from the operating levers 44 to the contact supporting arm 32. As will hereinafter appear these clevis-like members 46 and 47 are adapted to be biased into this fully telescoped relationship by a compression spring 67 which is contained in the box-like structure formed thereby.

With these latter figures of the drawings in mind and also by reference to Figure 6 of the drawings, it will be noted that the latching means 66 comprises two members 68 and 69 that are arranged side by side for movement about a pivot providing pin 70 which extends through downwardly depending arms 71 of the spaced supporting brackets 33. The member 68 is designed primarily to provide a latch function while the member 69 has a further function in that it will operate to exert a final circuit closing movement to the movable contact carrying arm 32. As here shown the outer ends of the members 68 and 69 are curved and are adapted to engage with a roller type abutment 72 which is disposed between the sides which form the arm 32. When these members 68 and 69 are in this position they will serve to prevent any circuit opening movement of the movable blade supporting arm 32 until the spaced operating levers 44 have swung backwardly to a point closely approaching the limit of their operating travel and where the reclosing spring 65 will be fully energized. In this connection it will be noted that the members 68 and 69 respectively have upstanding fingers 73 and 74 that are adapted to be engaged in reverse order by the outer transversely extending end 61' of the yoke-like member 61 which forms a part of and moves with the armature 38. These members 68 and 69 are shown in Figure 5 of the drawings as in the position they will assume at the instant of release. In this latter figure of the drawings it will be also noted that at this particular instant the clevis-like members 46 and 47 will have been extended to their limit of relative movement where outwardly extending and inter-locking ears 75 and 76 provided respectively thereupon will engage with each other. At this point the elastic connection provided by these members 46 and 47 will become in-elastic and as a result the armature 38 operating under the influence of the electromagnetic field 37 will exert a positive contact separating force which will break any freeze between the contacts and permit the compression spring 67 of the elastic connection to expand and thus complete the circuit opening movement of the movable contact supporting arm 32 at a time when the armature 38 is still held in its operating position. By now referring to Figure 6, wherein the latching member 68 has been omitted, the member 69 is shown in three different positions which will serve to illustrate its particular function. When the movable contact carrying arm 32 is in its open circuit position the abutment 72 will operate to hold the member 69 in its elevated position as indicated at A. As the arm 32 is operated into its circuit closed position the curved cam-like outer end of the member 69 will move downwardly under the influence of a biasing spring 77 and because of its eccentric cam-like character it will apply a final and supplemental force which will insure a full circuit closing movement of the circuit controlling contacts at a time when the reclosing spring 65 is approaching its spent condition. At this point it should be stated also that the latching member 68 is biased into its operating position by means of a spring 78, but in this case the biasing spring 78 is not as strong as the biasing spring 77 of the cam-like member 69, which is of considerably greater strength as it must serve to move the arm 32, as indicated above.

Now, before going on with reference to the remaining figures of the drawing, it will be noted that the telescoping members 46 and 47 which form the elastic connection, are of identical construction and when they are nested together as here shown, they will remain in operating alignment. The member 46, as shown in Figures 4 and 5 of the drawings, is connected to the operating lever 44 by a shaft 79, which extends through a spacing block 80, that has extending pins 81 to which the sides of the member 46 are secured. Likewise the member 47 is pivotally secured to the movable contact carrying arm 32 by means of a shaft 82, which extends through a spacing block 83. These telescoping members 46 and 47 are of such a length that when they have become fully telescoped their closed ends will engage with the spacing blocks 80 and 83, and thus they provide a rigid strut through which an operating force may be applied to the arm 32 from the spaced operating levers 44, when the armature 38 is magnetically released and moved into its retracted position under the influence of the reclosing spring 65. In this connection it will also be seen, upon reference to Figure 7 of the drawing, that the snap action spring 67 will be inclosed in a substantially box-like structure, and as a result no other means will be required for holding it in its operative position. This latter figure of the drawings is also of interest in its showing of the disposition of inter-locking the ears 75 and 76 which are respectively provided from the members 46 and 47. These members 46 and 47 are shown in an intermediate extended position, but when the parts are fully extended the ears 75 and 76 will engage with each other and provide an inelastic connection through which a positive operating force may be applied to the contact carrying arm 32 by the armature 38 as the latter comes more completely under the influence of the magnetic field structure 35.

By now referring to Figure 8 of the drawings and with Figure 5 also in mind, it will be seen that the armature 38 is supported by the pin 60 which extends through the operating levers 44 and is held in its vertical position by the stud 63, which passes through the opening 62 at the end 61' of the yoke-like member 61. In this connection it will also be noted that the transversely extended head 64 at the outer end of the stud 63 is disposed between the parallel sides of the yoke-like member 61 and is there held by laterally extending portions 64', which engage with the top and bottom edges at the sides of the yoke-like member 61. In this manner the stud 63 and the reclosing spring 65 will be held in operative alignment between the transversely extending pin 34 at the outer ends of the space brackets 33 and the pin 60, upon which the armature 38 is supported between the operating levers 44. At the other end of the stud 63 there is an adjustable nut 63' by which the initial compression of the reclosing spring 65 may be regulated.

In operation and assuming that the service restorer is in its circuit closed condition, as illustrated in Figure 2 of the drawing, it will be seen that upon the occurrence of an overload the armature 38 when attracted by the electro-magnetic field structure 35 will carry the operating levers 44 in a counter-clockwise direction about their pivotal axis upon the stud 45. This movement of the operating levers 45 will serve to extend the elastic connection provided by the telescoping members 46 and 47, and thereby cause the compression spring 67 to become compressed. At the same time, during this left to right movement of the armature, as viewed in Figure 5 of the drawing, will cause the end 61' of the yoke-like member 61, which forms a part of the armature 38, to move in a like manner and come into engagement with the upstanding fingers 73 and 74, carried respectively by the latching members 68 and 69. As this occurs the latching members 68 and 69 will be rotated about the pivotal axis 70 until their outer ends have moved upwardly, as here shown, and clear of the abutment 72 upon the movable contact carrying arm 32. At about the same instant it is also contemplated that the interlocking ears 75 and 76 of the telescoping members 46 and 47 will come into abutting relations, with the result that any further movement of the armature 38, under the influence of the magnetic field set up between the poles 36 and 37 of the magnetic field structure, will be transmitted in an inelastic manner directly to the movable contact carrying arm 32. This will further insure a positive breaking of the contact between the movable contact 31 and the stationary contact 27. This final magnetic attraction of the armature 38 will also be applied to the fingers 73 and 74 of the latching members 68 and 69, and also insure a positive unlatching of the movable contact carrying arm 32. At substantially the instant of release of the contact carrying arm 32 by the latching members 68 and 69 the compression spring 67 carried by the telescoping members 46 and 47 will become active and cause the movable contact carrying arm 32 to snap back and into its final open circuit position, as illustrated in Figure 3 of the drawing.

At the completion of the above operation it will be understood that upon an opening of the circuit by a separation of the circuit controlling contacts that the magnetic-field structure 35 will immediately become de-energized, and as a consequence the armature 38 will be released and returned to its initial position by the reclosing spring 65, which as will be seen was compressed by the previous movement of the armature 38 under the influence of the magnetic-field structure 35. As the armature 38 is thus returned to its original position, the pivotally mounted operating levers 44 will be caused to rotate in a clockwise direction about their pivotal axis 45. At this time the telescoping members 46 and 47 will be in their fully telescoped condition and as a result a positive force will be transmitted through these members from the operating levers 44 that will cause the movable contact carrying arm 32 to move from the position illustrated in Figure 3 of the drawing and into full engagement with the stationary contact 27 as shown in Figure 2 of the drawing. As the movable contact carrying arm 32 comes into this latter position, the latching members 68 and 69 will be free to drop down under the influence of their respective biasing springs 78 and 77 and thus latch the movable contact 31 into circuit restoring relation with the stationary contact 27. Now if the overload or fault which caused the opening of the circuit no longer exists the service restorer will remain inactive with the circuit through its contacts reestablished.

In circuit breaker parlance the above circuit opening and restoring operations will take place in a substantially instantaneous manner, or in as little time as is possible from the nature of the mechanical expedients employed. This is because of the fact that as previously suggested, the timing mechanism 50 is so constructed and arranged that its timing functions will not be brought into play until after a predetermined prior operation. For example, the timer 50 may be arranged to permit one or possibly two or more instantaneous circuit interrupting and restoring operations of the service restorer before its timing operations are set in motion. Then, when the timing mechanism 50 does come into operation it will provide for a delay in any subsequent circuit opening and/or circuit closing operation of the service restorer. To now continue with and explanation of the operation of our device, it will be understood that if the overload or fault has not been removed from the circuit by the first or previously described circuit opening and restoring operations, the electro-magnetic field 35 will be again subjected to the excessive current value immediately upon the reclosing of the circuit between the contacts 27 and 31. This will cause the armature 38 to be again attracted as in the above instance, and the circuit opening and restoring operations of our device will be repeated until the fault or overload is removed from the circuit. However, if the timing mechanism 50 is arranged so as to permit only one instantaneous circuit opening and restoring operation before coming into play, the subsequent operations of the restorer may be delayed during both its circuit opening and the reclosing operations. Under these conditions the latching means 55 and operating springs 67 and 65 will operate in the manner above described, but the movements of the spaced operating levers 44 will be controlled by the upwardly extending member 49 of insulating material that is connected through the link 51 to the timing sector 52 of the timing mechanism 50. At this point it may be stated that the timing mechanism 50, as herein stated, has a conventional inertia type escapement. If it should happen that the fault or overload is not removed at the end of a predetermined cycle of instantaneous and timed openings and reclosings of the circuit within a definite period of lapsed time, the latching hook 57 will engage with the pin 57' carried by the timing sector 52 of the timing mechanism 50, and lock the spaced operating levers 44 in an open circuit position. In this latter event the service restorer will remain locked-out until it is reset manually by a lineman after repairing the fault or eliminating the condition that has caused the overload upon the circuit.

In addition to providing for an automatic opening and a restoring of the circuit under faulted or overloaded condition upon the line, as above described, we have also provided a means whereby our service restorer may be operated manually at any time to open and/or close the circuit through the stationary contact 27 and movable contact 31. This is accomplished, as is more fully illustrated in Figure 9 of the drawings, by the lever arm 55, that is carried by the shaft 56, which is turned by the stick operated lever 23, previously described, as disposed externally of the tank 14. In this instance the lever arm 55 is mounted with limited free movement about the shaft 56, and this free movement is limited by a pin 84 that projects radially from the shaft 56, where it will alternately engage with two axially extending projections 85 and 86, which are formed upon the lever arm 55. Normally the lever arm 55 is biased by a spring 87 to position the pin 84 against the project 86, and when in the position here shown it will engage with the pin 54 carried by the upwardly extending insulation member 49. Under these conditions it will be seen that upon a clockwise rotation of the shaft 56, the pin 84 will because of its engagement with the projection 86, cause the lever arm 55 to move in a similar direction and carry the upwardly extending insulation member 49 from the position here shown by full lines and into the position indicated by dot and dash lines. When the lever arm 55 is in the dot and dash position as here shown, the pin 54 upon the upwardly extending member 49 will move around to the end of the lever arm 55 and when it has reached this position there will be established a toggle-like relationship between the insulation member 49 and the lever arm 55, which will serve to lock the service restorer in an open circuit condition. Now if it is desired to manually close the circuit through the service restorer the operator will rotate the shaft 56 counterclockwise until the pin 84 carried thereby, comes into engagement with the projection 85 of the lever arm 55. Then, upon further rotation of the shaft 56 the toggle relationship between the upwardly extending insulation member 49 and the lever arm 55 will be broken, and the reclosing spring 65 can then operate to move the movable contact 31 into its circuit closed position. With this arrangement it will be readily seen that, because of the free mounting of the lever arm 55 upon the shaft 56 there will be established a toggle-like relationship between the member 49 and the lever arm 55, which will serve to lock the service restorer in an open circuit condition. Under these conditions it will be also readily seen, because of the free mounting of the lever arm 55 upon the shaft 56 and the bias provided by the spring 87, that there will also be formed a trip-free relationship which will permit a quick circuit closing movement of the upwardly extending insulation member 49, without a transmission of this movement back to the operator, through the operating lever 23.

While we have, for the sake of clearness and in order to disclose the invention so that the same can be readily understood, described and illustrated specific forms and arrangements, it is to be understood that the invention may be embodied in other forms. It is believed that this invention is new and it is desired to claim it so that all such changes as come within the scope of the appened claims are to be considered as part of this invention.

Having thus described our invention, what we claim and desire to secure by Letters Patent is:

1. In a service restorer of the character described, the combination of a pair of spaced terminal bushings, a stationary contact mounted upon the lower end of one of said bushings, a supporting bracket carried by the other of said bushings and extending toward said stationary contact, a movable contact arm pivotally mounted at the outer end of said bracket and adapted to swing through an arc and into and out of engagement with said stationary contact, an electro-magnet also carried by said bracket and having its energizing coil connected in series circuit with said movable contact, an operating lever pivotally mounted upon said bracket adapted to move about an axis disposed between said electro-magnet and the axis about which said movable contact swings, an armature carried by said operating lever outwardly from its pivotal axis adapted to be attracted by said electro-magnet and move said operating lever about its pivotal axis whenever current in excess of a predetermined value is flowing through said stationary and movable contacts, an energy storing spring means connected directly between the outer end of said operating lever and a point upon said movable contact arm outwardly from its pivotal axis, a latching means for holding said movable contact arm in a circuit closed position, and trip operating means movable with said operating lever adapted after a predetermined pivotal movement thereof to trip said latching means, whereby the pivotal movement of said operating lever about its pivotal axis under the influence of said electro-magnet will first serve to store energy in said energy storing spring means and after said predetermined pivotal movement actuate said trip operating means and thus permit said energy storing spring means to move said contact arm into its open circuit position independently of said operating lever.

2. In a service restorer of the character described, the combination of a pair of spaced insulating bushings, a stationary contact mounted upon one of said bushings, a supporting bracket carried by the other of said bushings, a movable contact pivotally mounted upon said bracket substantially midway between said bushings and adapted to swing through an arc into and out of engagement with said stationary contact, an electro-magnet also carried by said bracket having an energizing coil connected in series circuit with said movable contact, an operating lever pivotally mounted upon said bracket to swing about an axis disposed between said electro-magnet and the axis about which said movable contact pivots, an armature carried by said operating lever adapted to be attracted by said electro-magnet and move said operating lever in a circuit opening direction when current in excess of a predetermined value is flowing through said energizing coil, an elastic energy storing connection extending directly between the outer end of said operating lever and a point upon said movable contact outwardly from its pivotally mounted end, a latching means adapted to normally retain said movable contact in a circuit closed position, means carried by said operating lever adapted to trip said latching means after a predetermined amount of energy has been stored in said elastic connection by a swinging movement of said operating lever under the influence of said electro-magnet, and means associated with said elastic energy storing connection for establishing a direct non-elastic connection between said operating lever and said movable contact as said armature approaches the end of its pivotal movement under the influence of said electro-magnet, whereby said movable contact will be initially moved in a circuit opened direction by the direct action of said electro-magnet and finally out of full engagement with said stationary contact by the joint action of said armature and said elastic energy storing connection.

3. In an operating mechanism for a service restorer of the character described having relatively movable contacts, the combination of a stationary contact, a supporting bracket disposed at one side and spaced from said stationary contact, a swingable contact arm pivotally mounted at the outer end of said bracket and adapted to engage with said stationary contact to complete a circuit, an electro-magnet having a coil connected in series circuit with said swingable contact arm, an operating lever pivotally mounted upon said bracket at a point further removed from said stationary contact and having an armature portion operatively associated with said electro-magnet, a spring means for normally retaining said operating lever in a circuit closed position, an elastic energy storing connection extending directly between the outer end of said operating lever and said contact arm outwardly from its pivotal axis, said elastic energy storing connection having interlocking slidable parts which abut when a circuit closing movement is imparted to said movable contact arm by said operating lever and a contained spring means that will permit an independent reverse movement of said operating lever when said armature is attracted by said electro-magnet, a latching means for holding said contact arm in a circuit closed position, and means operated by a final pivotal movement of said operating lever under the influence of said electro-magnet for rendering said latching means inoperative and thus permit said elastic energy storing connection to collapse and move said pivotally mounted contact arm into an open circuit position independently of said operating lever.

4. In a service restorer of the character described, the combination of a stationary contact, a pivotally mounted contact adapted to swing into engagement with said stationary contact and establish a circuit therebetween, an electro-magnet having a coil adapted to be energized by current passing through said contacts, an operating lever mounted adjacent said electro-magnet, an armature carried by said operating lever and operating with said electro-magnet to move said operating lever in a circuit opening direction when current in excess of a predetermined value is impressed upon said coil, an extendable elastic energy storing connection between said pivotally mounted contact and the end of said operating lever, a latching means for holding said pivotally mounted contact in a circuit closed position until said extendable elastic energy storing connection has been extended a predetermined amount, a reclosing spring means adapted to be first compressed by movement of said operating lever under the influence of said electro-magnet and subsequently return said operating lever to its initial position immediately upon an opening of a circuit through said contacts, and means carried by said operating lever for rendering said latching means inoperative when said operating lever has moved a predetermined distance under the influence of said armature whereby said operating lever will first operate through said extendable elastic energy storing connection to move said movable contact out of engagement with said stationary contact with a snap-like action and subsequently under the influence of said reclosing spring operate through said extendable elastic energy storing connection in an unextended condition to move said movable contact into reengagement with said stationary contact and thus restore the circuit.

5. In a spring operated circuit opening and reclosing mechanism for an electro-magnetically controlled reclosing circuit breaker, the combination of an electro-magnet having an energizing coil connected in series circuit with the circuit breaker contacts, an operating lever adapted to be moved by said electro-magnet in the event of an overload current condition in the circuit breaker, a movable contact controlled by movements of said operating lever, a latch normally operating to retain said movable contact in a closed circuit position, an elastic energy storing connection between said operating lever and said movable contact adapted to permit movement of said operating lever in one direction independently of said movable contact, a reclosing spring means for moving said operating lever into a circuit closed position and adapted to be energized by movement of said operating lever under the influence of said electro-magnet, and a tripable latching means for retaining said movable contact in its circuit closed position, means movable by said operating lever for tripping said latching means at a point approaching the limit of travel of said operating lever, whereby a circuit opening movement will be imparted to said moving contact by said elastic energy storing connection independently of and while said operating lever continues its movement under the influence of said electro-magnet and before said reclosing spring means becomes operative to move said movable contact into reengagement with said stationary contact.

6. In a reclosing circuit breaker of the service restoring type, the combination of a stationary contact, a movable contact adapted to engage with said stationary contact, an energy storing spring means for moving said contact member into an open circuit position, a second energy storing spring means for moving said contact member into a closed circuit position with respect to said stationary contact, an electro-magnet having an energizing coil connected in series circuit with said movable contact member, an operating lever attracted and moved by said electro-magnet to store energy in each of said energy storing spring means when a current in excess of a predetermined value flows through the energized coil of said electro-magnet, a pivotally mounted latch for retaining said movable contact member in a closed circuit position against the action of said first spring means, and means carried by said operating lever for tripping said pivotally mounted latch after movement of said operating lever has caused said first and second energy storing spring means to become fully energized, whereby in the event of an excessive current flow said movable contact member will be moved into an open circuit position by said first spring means and then returned to its circuit closed position by said second spring means independently of said first spring means as a substantially continuous operation.

7. In a reclosing circuit breaker of the service restoring type, the combination of a stationary contact, a movable contact member, a normally inactive compression spring for moving said contact member into an open circuit position, a second normally inactive compression spring for moving said contact member into a circuit closed position with respect to said stationary contact, a magnetic field structure having an energizing coil connected in series circuit with said movable contact member, a pivotally mounted lever attracted and moved by said magnetic field structure to compress said first and second springs when a current in excess of a predetermined value flows through the energizing coil of said field structure, a latching means for retaining said movable contact member in its closed circuit position against the action of said first compression spring, and means carried by operating lever for tripping said latching means after said operating lever has operated to cause said first and second compression springs to become fully compressed, whereby in the event of an excessive current flow through the circuit breaker said movable contact member will be moved to an open circuit position by said first spring and returned to its circuit closed position by said second spring independently of said first spring as a single and continuous operation.

JOSEPH S. THOMPSON.
CHARLES R. RAY.

REFERENCES CITED

The following references are of record in the file of this patent:

UNITED STATES PATENTS

| Number | Name | Date |
|---|---|---|
| 474,921 | Pfannkuche | May 17, 1892 |
| 2,240,196 | Solenthaler | Apr. 29, 1941 |
| 2,298,143 | May | Oct. 6, 1942 |